United States Patent [19]

Olson

[11] 4,083,612
[45] Apr. 11, 1978

[54] NON-ROTATING STABILIZER FOR EARTH BORING AND BEARING THEREFOR

[75] Inventor: Wallace Fred Olson, Midland, Tex.

[73] Assignee: Smith International, Inc., Midland, Tex.

[21] Appl. No.: 732,608

[22] Filed: Oct. 15, 1976

[51] Int. Cl.² ..................... F16C 17/00; F16C 17/08
[52] U.S. Cl. .................................. 308/4 A; 166/241; 308/135; 308/238; 308/239
[58] Field of Search ............... 308/4 R, 4 A, 8.2, 37, 308/134.1, 135, 139 R, 160, DIG. 7, DIG. 8, 238, 158, 163, 239; 166/241; 175/76, 325, 406, 408

[56] References Cited

U.S. PATENT DOCUMENTS

| | | | |
|---|---|---|---|
| 2,253,416 | 8/1941 | Caldwell | 308/134.1 |
| 2,274,764 | 3/1942 | Yeomans | 308/160 |
| 2,696,367 | 12/1954 | Robishaw | 308/4 A |
| 3,436,129 | 4/1969 | James | 308/238 |
| 3,774,983 | 11/1973 | Lagally | 308/DIG. 8 |
| 3,932,004 | 1/1976 | Orndorff | 308/DIG. 8 |

*Primary Examiner*—Trygve M. Blix
*Assistant Examiner*—Charles E. Frankfort
*Attorney, Agent, or Firm*—Murray Robinson; Ned L. Conley; David Alan Rose

[57] ABSTRACT

A stabilizer for a big hole drill stem includes a journal, i.e., a sleeve, adapted to be slipped over the stem. The sleeve has an apertured lower flange to seat on the stem stool and receive the pins thereof to prevent relative rotation of sleeve and stem. The upper end of the sleeve has a clutch jaw for interlocking with the clutch jaw on the lower end of a canister weight forming part of a drill string assembly. Also, the upper end of the sleeve, just below the clutch, has a split clamp held in frictional engagement with the sleeve in an annular groove thereabout. Just below the clamp there is an annular upper flange having stop lugs engageable between the ears of the clamp to prevent relative rotation. Rotatably mounted on the sleeve between the upper and lower flanges is a fixed blade stabilizer body. A marine bearing is provided at the inner periphery of the stabilizer to take radial loads. The marine bearing is fabricated from a plurality of fluted rubber rings cemented to each other and to the steel part of the body. Between each end of the body and the flanges is a thrust bearing. Each thrust bearing is a sandwich comprising two thrust plates, one screwed to the body and one screwed to the adjacent flange, with a support plate studded with thrust buttons floating therebetween. The buttons have heads and extend through holes in the retainer plate with the heads alternately on opposite side of the retainer plate. Preferably the thrust buttons are made of a long wearing, hard, high strength plastic, compatible with salt water, drilling mud, sand, and rock cuttings, a suitable plastic being one sold under the tradename "Ultra-Cladd" or "Ultra-Wear", same being an ultra high molecular weight polyethylene.

23 Claims, 16 Drawing Figures

FILLED WITH
DENSE FLUENT
MATERIAL,
e.g. SAND

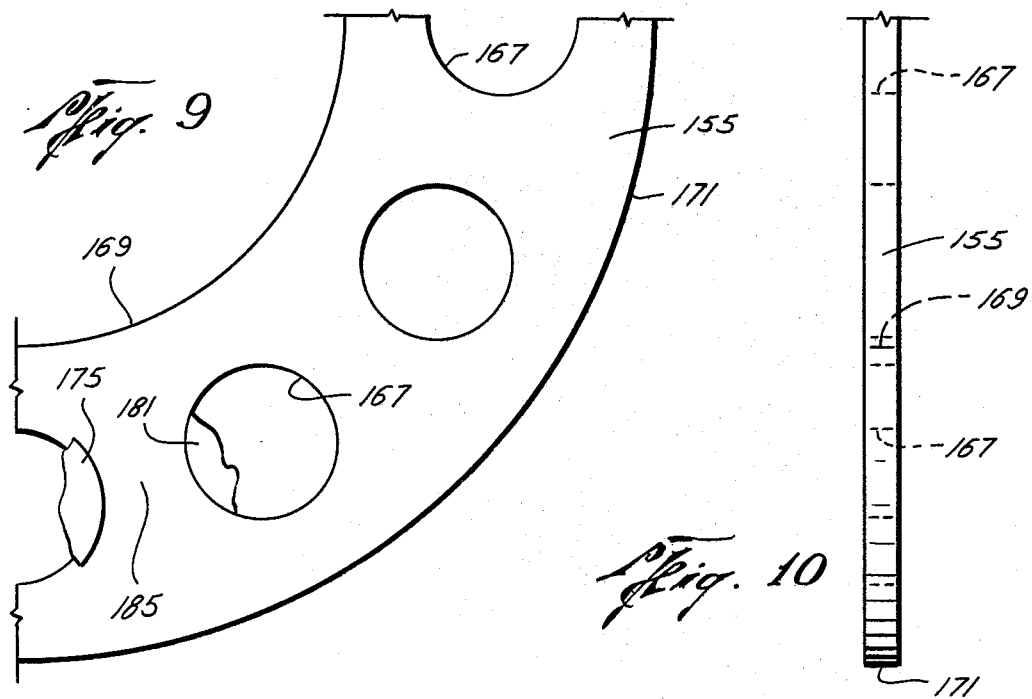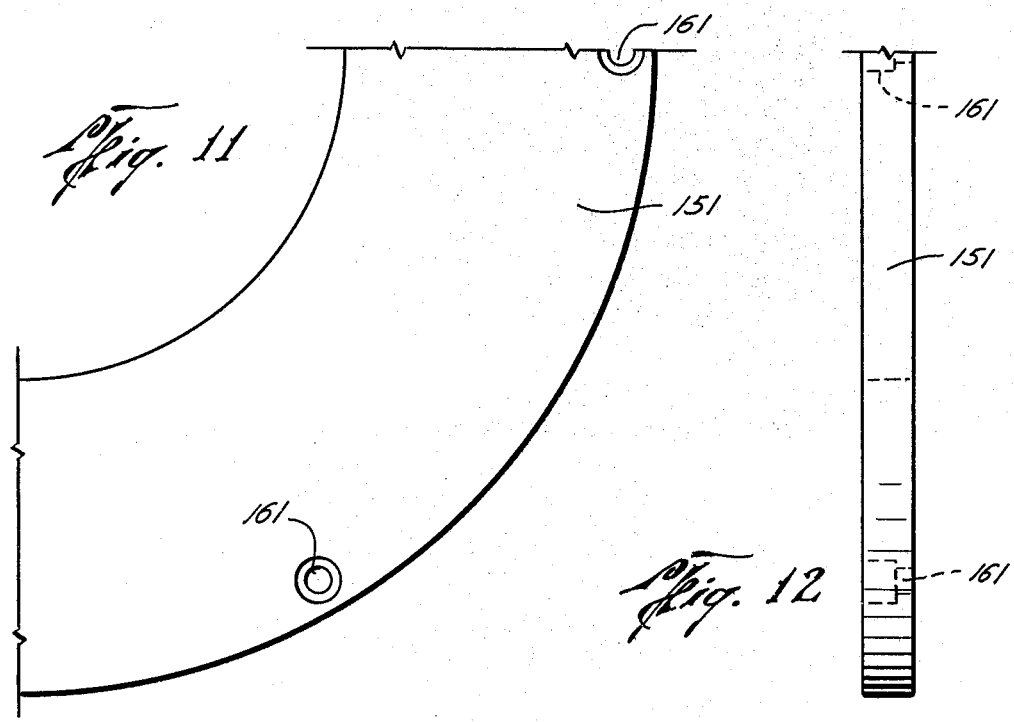

NON-ROTATING STABILIZER FOR EARTH BORING AND BEARING THEREFOR

BACKGROUND OF THE INVENTION

This invention pertains to earth boring tools and more particularly to a fixed blade non-rotating stabilizer especially adapted for drilling large diameter blind holes, e.g., over 30 inches in diameter.

In big hole drilling the tubular drill stem usually is provided at its lower end with a stool to the bottom of which is bolted a drilling cutter assembly or drill bit. An assembly of tools such as stabilizers and weights are spindled on the drill stem, the lower end of the assembly being supported by the stool. Usually the tool assembly merely rests in frictional engagement with the stool although in some cases the stem has been provided with a clutch jaw fixed thereon and engageable with a clutch jaw in the stabilizer skirt to positively prevent relative rotation of the stabilizer sleeve on the drill stem. Sometimes the stabilizer has been formed integral with the stool itself. Sometimes the stem is omitted and the tools are provided with flanges which bolt together to form an assembly to transmit torque to the drill bit or cutter assembly.

Fixed blade non-rotating stabilizers are well known for use both in small diameter holes such as oil wells and blast holes and in big holes. Various forms of anti-friction bearings have been used, at least with smaller size stabilizers. See for example the copending United States patent applications of applicant's assignee, Ser. Nos. 720,695; 720,954; 721,089; 721,090 filed Sept. 7, 1976. In connection with big hole stabilizers, marine bearings for radial loads have been used. Also steel thrust plates with bronze thrust bodies held to one side thereof by cap screws have been employed, the thrust plates being fastened to the rotating part of the stabilizer.

Difficulty has been experienced with the thrust bearings for big hole stabilizers because of the heavy weight involved. For example the non-rotating body of the stabilizer may weigh over a ton.

Roller stabilizers for big hole drilling are disclosed in U.S. Pat. to applicant's assignee Nos. 3,302,983 and 3,413,045, which disclose the use of marine bearings and of roller thrust bearings for the stabilizer rollers. Also, the latter patent shows the use of pinned and apertured flanges for making flanged connections between a big hole stabilizer and a drill bit and drill collar. However these patents are not concerned with bearings for non-rotating stabilizers, nor the stacking of big hole tools about a drill stem, nor the provision of means to insure that relative rotation occurs at the bearings between the non-rotating stabilizer body and its journal or inner sleeve rather than between the sleeve and the drill stem.

SUMMARY OF THE INVENTION

According to the invention an assembly of big hole tools, i.e. non-rotating stabilizers and weight canisters, each having an internal sleeve providing a passage therethrough, are spindled on a drill stem with their weight resting on a stool connected to the lower end of the drill stem. The sleeves of the tools in the assembly are interlocked to each other to prevent relative rotation. The sleeve of the lowermost tool of the assembly is interlocked with the stool to prevent relative rotation. A split clamp disposed in an annular groove in the drill stem engages the sleeve of the uppermost tool of the assembly thereby holding the assembly down on the stool and preventing relative axial movement of the assembly and drill stem.

Each non-rotating stabilizer in the tool assembly comprises a journal formed by a sleeve, with a fixed annular flange welded to the lower end of the sleeve and a loose annular flange disposed near the upper end of the sleeve. The lower flange is provided with a ring of sockets receiving upstanding pins on the stool to interlock the fixed flange and sleeve to the stool. A split clamp frictionally engaging an annular groove around the upper end of the sleeve keeps the loose flange from coming off the top of the sleeve. Also, lugs on the loose flange engage between the ears of the clamp to prevent relative rotation. A clutch jaw at the extreme upper end of the sleeve engages a correlative jaw on the lower end of a weight canister sleeve. The upper end of the weight canister sleeve is provided with a pinned flange to receive another stabilizer sleeve.

Around each stabilizer sleeve, between the fixed and free flanges, is disposed a fabricated, fixed blade, stabilizer body. At its inner periphery the stabilizer body has a marine radial bearing within which rotates the stabilizer sleeve. The radial bearing comprises a stack of a plurality of internally fluted rubber rings cemented one to the other and to the adjacent steel of the fabricated body.

Between each end of the stabilizer body and the adjacent fixed or loose flange is a thrust bearing. Each thrust bearing includes a pair of annular thrust plates, one plate being connected to the adjacent end of the stabilizer body by a ring of screws and the other being connected to the adjacent flange by a ring of screws. Between each pair of thrust plates is disposed an annular support or retainer plate. The retainer plate has a ring of holes therethrough. Thrust buttons extend through the holes to engage the thrust plates. The buttons have heads and the buttons are disposed with their heads alternately on one and the other side of the retainer plate. The buttons are made of hard, high strength, wear resistant, low friction material adapted for long life in the expected environment of salt water, drilling mud, cuttings and sand. Preferably the buttons are made of a plastic known to the trade as "ULTRA-CLADD" or "ULTRA-WEAR". This product is available from Indian Industries, Arlington, Texas, and is an ultra high molecular weight polyethylene.

The drill string including the stabilizer in accordance with the invention is intended for use in rotary drilling in which the drill string is rotated to turn a bit against the bottom of the hole, and drilling fluid is pumped down the drill string, out around the bit to pick up the cuttings, and back up the hole in the annulus around the exterior of the drill string. Or in reverse circulation the fluid is pumped down the annulus and back up inside the drill string. In either case drilling fluid in the annulus must move through or past the stabilizer. Some of the fluid will flow between the blades on the outer periphery of the stabilizer body. Some of the fluid will flow through vent holes in the end plates of the fabricated body and then through the hollow body, the vent holes also preventing the body from trapping air and providing bouyancy. The remainder of the drilling fluid will flow radially through the thrust bearings and axially through the radial bearing providing lubrication for them all.

With this material and construction, the thrust bearings have a longer life than was obtained with the prior art friction bearings discussed above. Also, the construction of the thrust bearings adapts them to easy replacement if they do wear out. The interlock of the sleeves with the drill stem insures that rotation takes place at the bearings rather than between the sleeves and mandrel. This prevents wear between the stabilizer sleeve flanges and the flanges on the canisters and the drill stem stool and between the sleeve and stem. Other advantages and objects of the invention will appear from the following description of a preferred embodiment thereof, reference being had to the accompanying drawings.

BRIEF DESCRIPTION OF THE DRAWINGS

The drawings are to scale. For reference, the well bore has a diameter of four feet.

FIG. 9 is a fragmentary top view of one of the thrust button support rings of the stabilizer's thrust bearings;

FIG. 10 is a side view of the ring portion shown in FIG. 9;

FIG. 11 is a fragmentary top view of one of the thrust plates of the stabilizer's thrust bearing;

FIG. 12 is a side view of the ring portion shown in FIG. 11;

DESCRIPTION OF THE PREFERRED EMBODIMENT

Tool Assembly and Details of Canister

Figure 1:
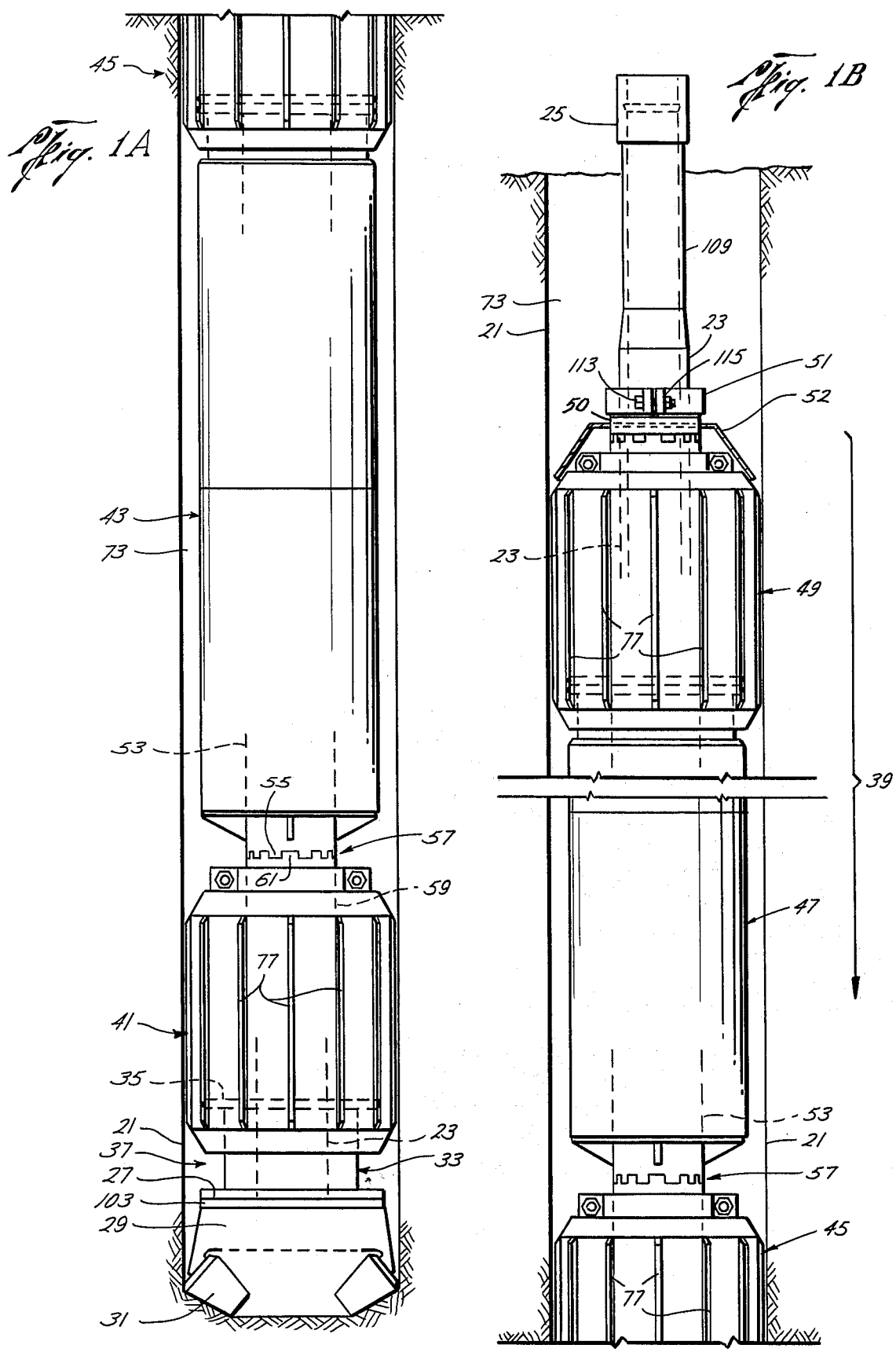
FIGS. 1A and 1B, together hereinafter referred to as FIG. 1, form an elevation showing the lower portion of a well bore in which is disposed the lower part of a drill string including a drill bit, drill stem with stool, and assembly of tools on the stem including weight canisters and stabilizers in accordance with the invention.

Referring now to FIG. 1 there is shown an earth bore 21. This is a typical "big hole", having a diameter of four feet. Within the earth bore is the lower portion of a rotary drilling string comprising a tubular drill stem 23. At the upper end of the stem is a threaded box 25 for making connection with the next above component of the drill string, e.g., a length of drill pipe. At the lower end of the drill stem there is a flange 27 welded to the stem. A drill bit or drilling roller cutter assembly 29 is secured to the flange by a ring of bolts (not shown). The assembly 29 includes a plurality of rotatably mounted toothed cones 31.

Figure 3A:
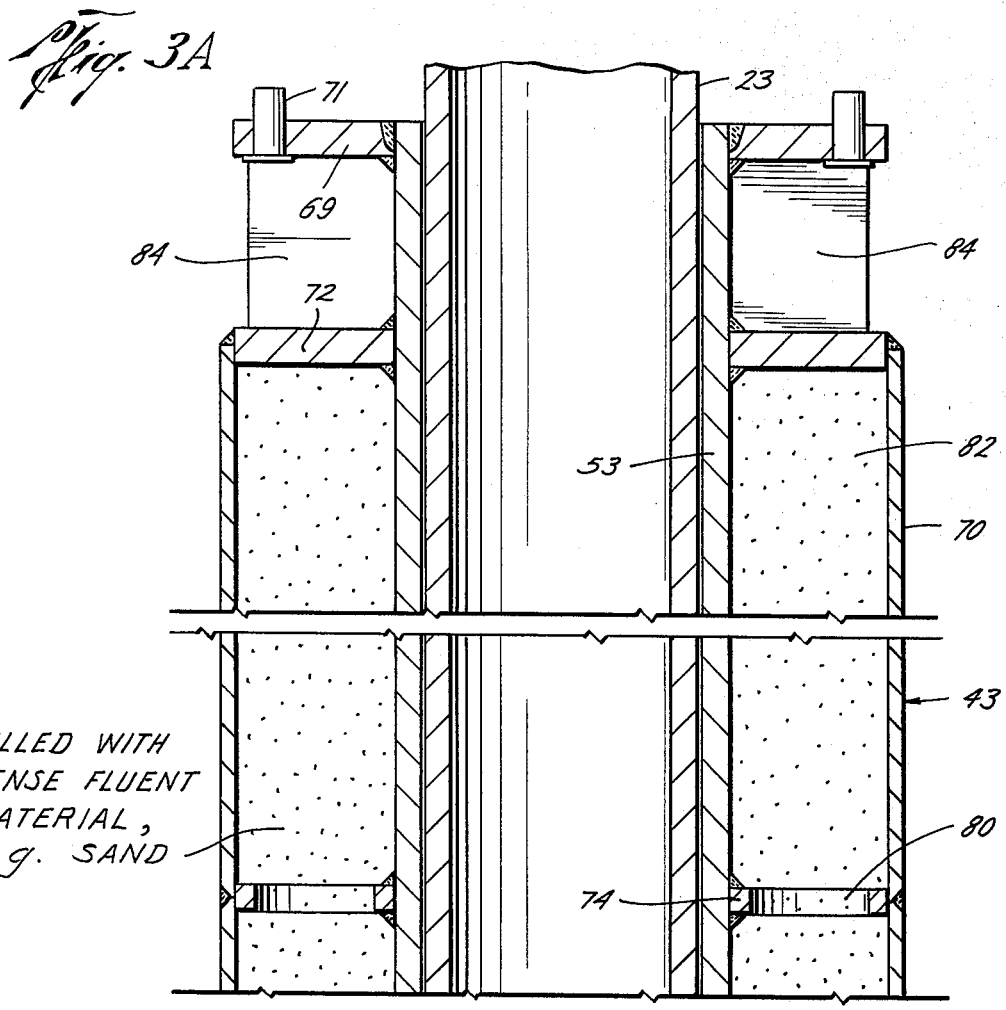
FIGS. 3A and 3B, together hereinafter referred to as FIG. 3, form an axial section to the same scale as FIG. 2 showing one of the stabilizers and the weight canister thereabove, both mounted on the drill stem and its stool.
Figure 3B:
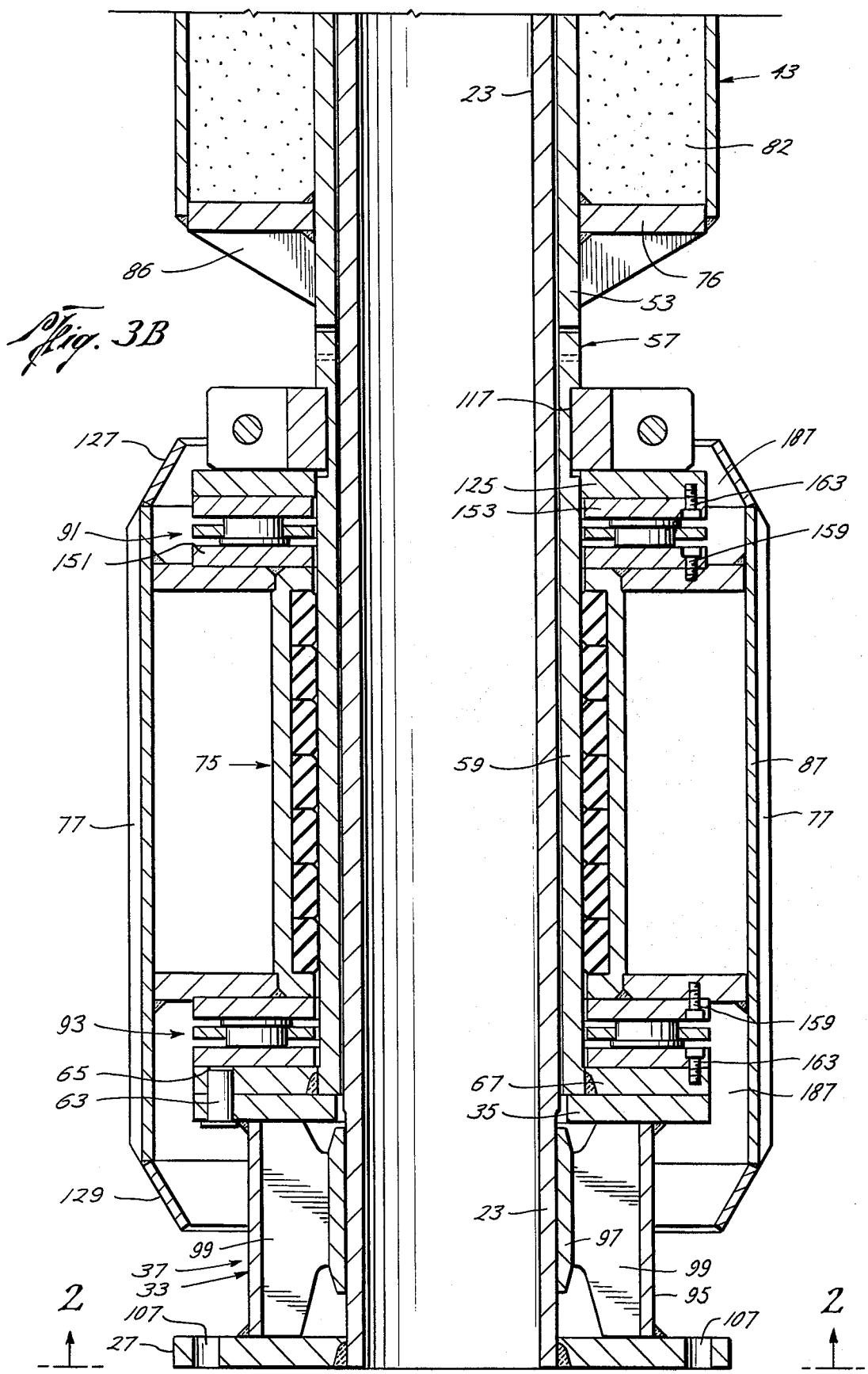

On top of flange 27 is welded a wheel 33 (see also FIG. 3B). On top of wheel 33 is welded flange 35. Together flanges 27 and 35 and wheel 33 form a stool 37.

Resting with their weight on stool 37 is an assembly 39, of annular drilling tools, each having an internal sleeve spindled on drill stem 23. The assembly includes stabilizer 41, weight canister 43, stabilizer 45, weight canister 47 and stabilizer 49. A split hold-down clamp 51 frictionally engages an annular groove in and around the drill stem 23 just above stabilizer 49. A ring 50 welded to guard cone 52 is disposed between clamp 51 and stabilizer 49. Cone 52 acts as a guide to facilitate removal of the drill stem and tool assembly from the earth bore. The tool assembly is held against axial motion relative to stem 23 by clamp 51 and stool 37. The tool sleeves are held against rotation relative to each other and relative to drill stem 23 by means next to be described.

At the bottom of each weight canister sleeve 53 (see also FIG. 3B) is one jaw 55 of a jaw clutch 57. At the top of the tubular journal or sleeve 59 of each stabilizer is the other jaw 61 of the clutch 57. The clutches 57 prevent relative rotation of the stabilizers and weight canisters thereabove.

Referring now more particularly to FIG. 3B, but also to FIG. 1, the top flange 35 to stool 37 is provided with a plurality of upstanding pins 63 which engage sockets or holes 65 in flange 67 welded to the lower end of stabilizer sleeve 59. Other means, hereinafter described, prevent relative rotation of each stabilizer and the stool or canister therebelow.

As best shown in FIGS. 3A and 3B, each canister includes a plurality of tube sections welded together to form a drum 70. The drum is concentric with canister sleeve 53, being positioned thereabout by a plurality of bulkheads 72, 74, 76 welded to the drum and sleeve. The inner bulkheads 74 are provided with a plurality of holes 80 which interconnect the interior space 82 of the canister so that it can be easily filled with high density material such as sand, lead shot, cement, or other high density material. This material is inserted by cutting a hole in the drum and pouring the material in and then closing the hole. The end bulkheads 72, 76 are welded to Gussett plates 84, 86 for added support.

Welded to the upper end of canister sleeve 53 and gasket plates 84 is a flange 69, which is provided with a plurality of upstanding pins 77. The pins 77 are received in the holes 65 in flange 67 on the sleeve of the stabilizer thereabove. The apertured stabilizer flanges 67 on the one hand and the pin studded canister flanges 69 and stool flange 35 on the other, provide clutch means which prevent relative rotation of the stabilizers and the stool or canisters therebelow.

Anchoring of tool assembly 39 to drill stem 23 in the manner just described prevents relative axial and rotational motion of the drill stem and tool sleeves, thereby eliminating wear that would be caused by such motion.

OPERATION

In operation, the drill string is rotated in the earth bore, e.g., by surface means such as a rotary table or power swivel, thereby rotating the cutter assembly or drill bit 29 against the end of the bore. Fluid is pumped down the drill pipe and drill stem and out through openings in the cutter assembly and flows back up the annulus between the earth bore wall and the drill string, carrying the cuttings to the surface. If the earth bore is in the ocean floor, conductor pipe may be used to extend the annulus through the water to the top surface. The weight canisters bear down on the cutter assembly through stool 37, thereby urging the cutters 31 into the bottom of the bore. The drill stem and stabilizer sleeves, interlocked against rotary rotation as described above, rotate within the outer bodies 75 (FIG. 3B) of the stabilizers 41, 45, 49. Ribs 77 on the outer peripheries of the bodies 75 centralize the stabilizer bodies in the earth bore and the bodies in turn centralize their sleeves and the drill stem in the bore. This causes the drilling cutter assembly to tend to drill a straight bore.

FLUID PATHS

Figure 6:
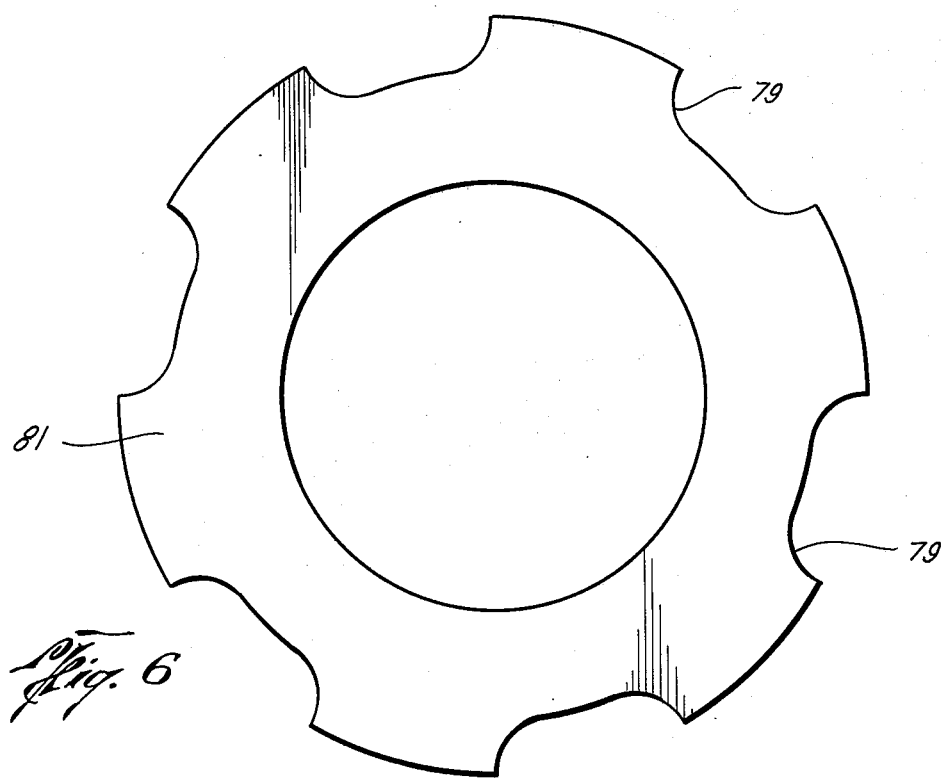
FIG. 6 is the top view of one of the body plates of the stabilizer.

During drilling, drilling fluid passes up outside the bodies 75 of the stabilizer between blades 77. Fluid also flows upwardly inside the stabilizers through openings 79 (FIGS. 4 and 6) in the end plates 81 thereof and through the interior space 83 between the concentric inner and outer shells 85, 87 welded to the end plates to form the stabilizer body. Fluid also flows between the inner sleeve 59 and the outer body 75 of each stabilizer, travelling through the radial bearings 89 and the upper and lower thrust bearings 91, 93 by means of which the sleeve 59 is rotatably mounted within the stabilizer body. The latter fluid flow lubricates and cools the bearings, but because of its nature is also injurious to the bearings, since the usual fluid will be a mixture of salt water, drilling mud, sand and cuttings. For this reason bearings of special construction are provided in accordance with the invention.

DRILL STEM AND STOOL

Figure 2:
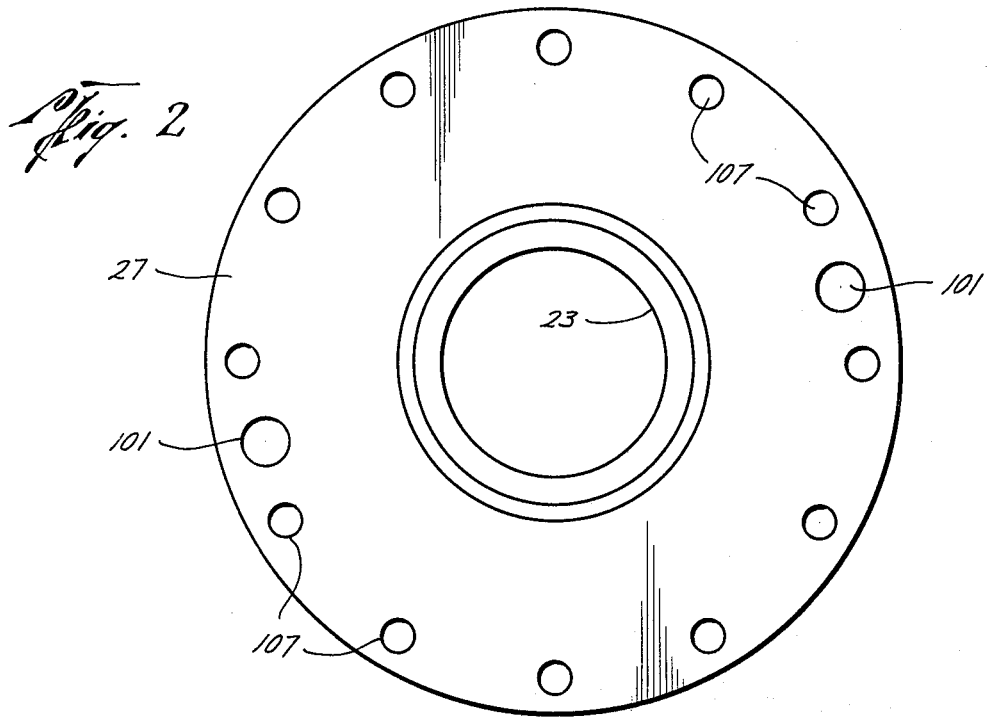
FIG. 2 to a larger scale than FIG. 1, is a bottom view of the drill stem stool shown in FIG. 1.

The drill stem 23 on which the tool assembly 39 is disposed is shown in FIGS. 1, 2 and 3, and the stool 37, at the lower end thereof is best shown in FIG. 3B. The "wheel" 33, welded to the bottom flange 27 of the stool 37, comprises a rim 95, a hub 97, and a plurality of spokes or radial plates 99. The spokes are welded to the hub and rim. The hub fits closely around drill stem 23 to give lateral support to the stool.

The bottom flange 27 of the stool is best shown in FIG. 2. It is provided with sockets or holes 101 to receive upstanding pins (not shown) on top flange 103 (FIG. 1) of the drill bit or cutter assembly 29, the pins being similar to pins 71 (FIG. 3B) on top of canister flange 69. In addition, bottom flange 27 of the stool is provided with a ring of holes 107 to receive bolts (not shown) which pass through like holes in top flange 103 of the drill bit assembly and hold the flanges together.

As shown in FIG. 1B, the upper end of the drill stem is reduced wall thickness forming a neck 109 of the same size as drill pipe to be connected thereto by box 25. Box 25 can be screwed onto neck 109 or welded thereto or formed integrally therewith.

Just below neck 109 there is an annular groove around the drill stem. It is in this groove that split clamp 51 is disposed. The two halves of clamp 51 are held together and in tight frictional engagement with the bottom of groove 111 so as to prevent the clamp from coming out of the groove or rotating therein about the drill stem. Bolts and nuts 113, 115 hold the two halves of the clamp together in that manner.

STABILIZER ASSEMBLY

Figure 4:
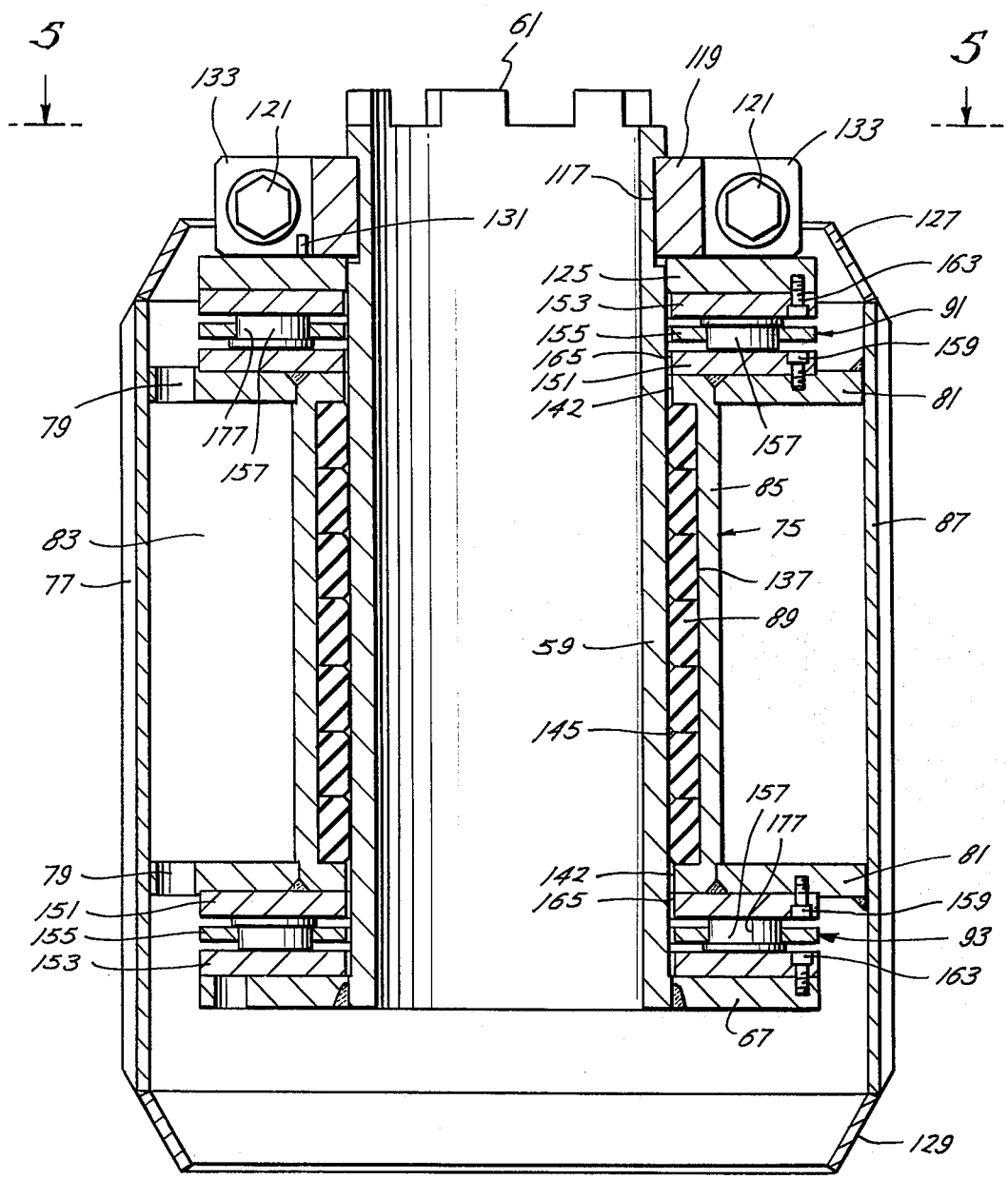
FIG. 4 is a view similar to FIG. 3A but showing only the stabilizer without the drill stem and weight canister.
Figure 5:
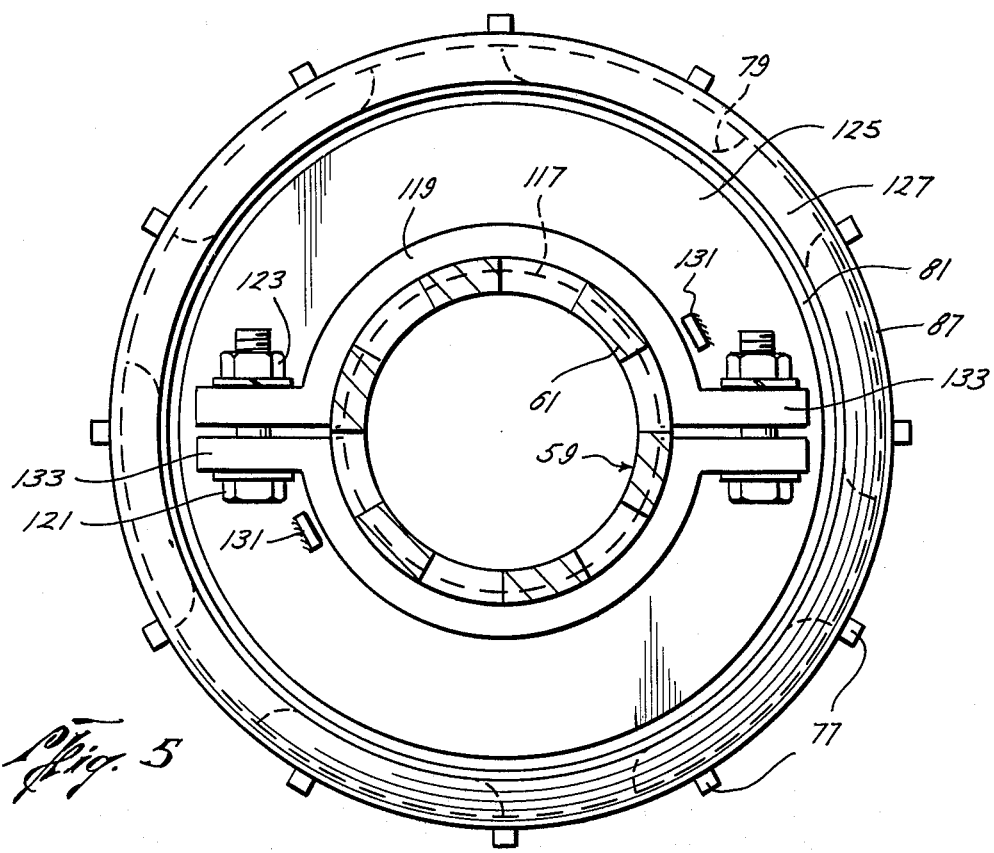
FIG. 5 is a top view of the stabilizer shown in FIG. 4.

Referring now to FIGS. 1, 3B and more particularly to FIGS. 4 and 5, each stabilizer includes inner sleeve or journal 59 which is rotatably mounted within body 75. Welded to the lower end of sleeve 59 is fixed flange 67. There is an annular groove 117 around the upper part of sleeve 59. A split clamp 119, similar to split clamp 51, is held in tight frictional, nonrotatable engagement with sleeve 59 within groove 117 by means of bolts and nuts 121, 123. An annular flange 125 is disposed around sleeve 59 and is restricted against upward movement by hold down clamp 119. As shown in FIG. 5, stop lugs 131 welded to the top of flange 125 limit relative rotation of the flange and sleeve 59, being positioned to engage the apertured ears 133 on the clamp through which pass the bolts 121.

Thrust bearings 91, 93, support the stabilizer body 75 between fixed flange 67 and loose flange 125. The thrust bearings bear against the end plates 81, 83 of the stabilizer body. The inner shell 85 of the stabilizer body is disposed around sleeve 59 and rotatably mounted thereon by radial bearing 89. The outer shell 87 of the stabilizer body is welded to the end plates 81 and carries the ribs or blades 77. Conical guards 127, 129 on the upper and lower ends of outer shell 87 protect the thrust bearings 91, 93 when the stabilizer is moved axially in the earth bore and help guide the stabilizer past inward protrusions in the bore.

RADIAL BEARING

Figure 7:
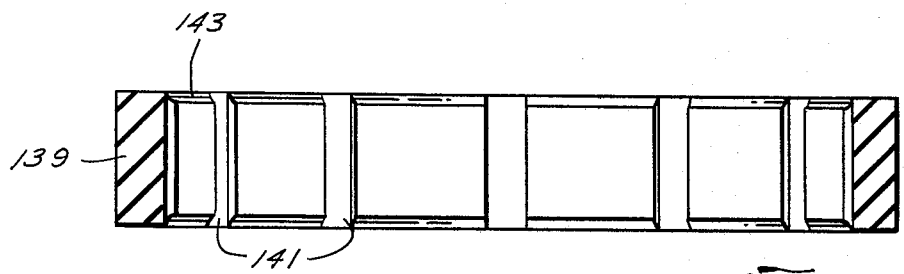
FIG. 7 is an axial section through one of the bearing rings of the stabilizer's radial bearing.
Figure 8:
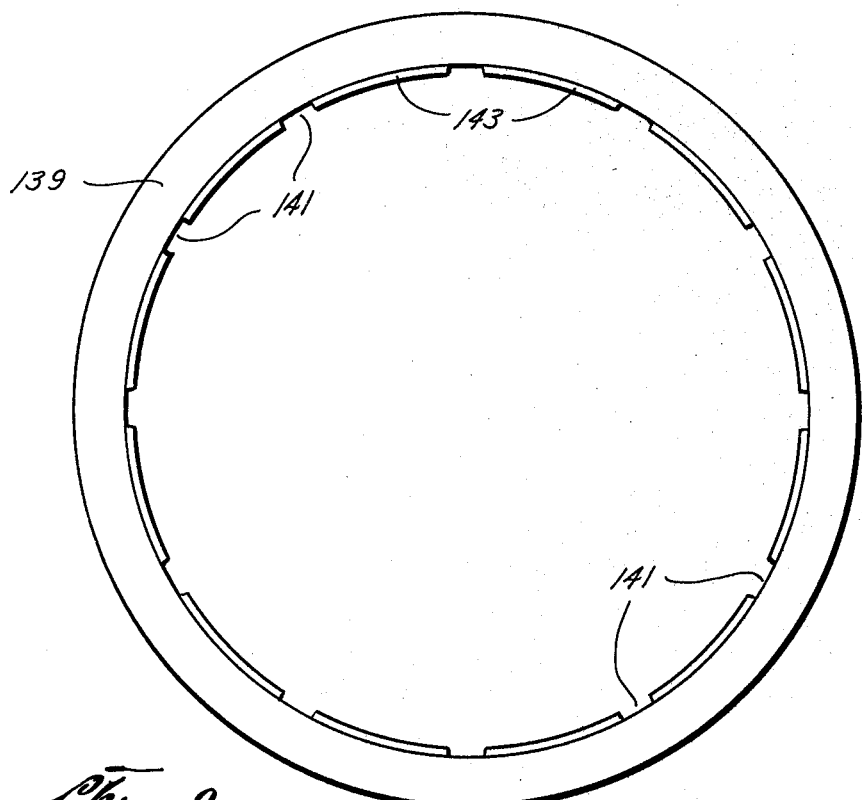
FIG. 8 is a top view of the ring shown in FIG. 7.
Figure 13:
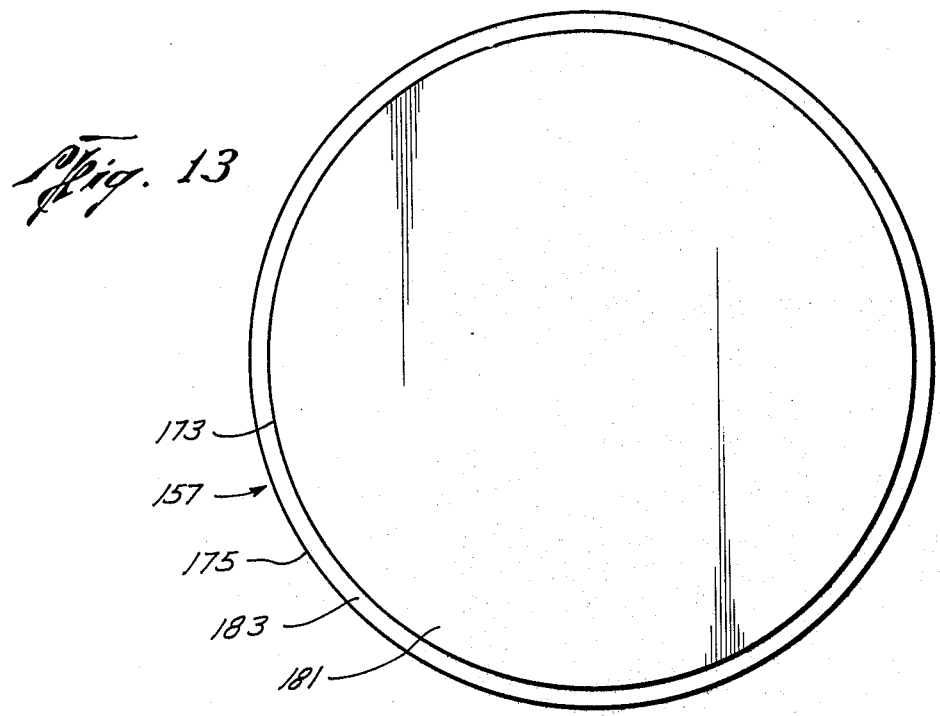
FIG. 13 is an end view of one of the thrust buttons.
Figure 14:
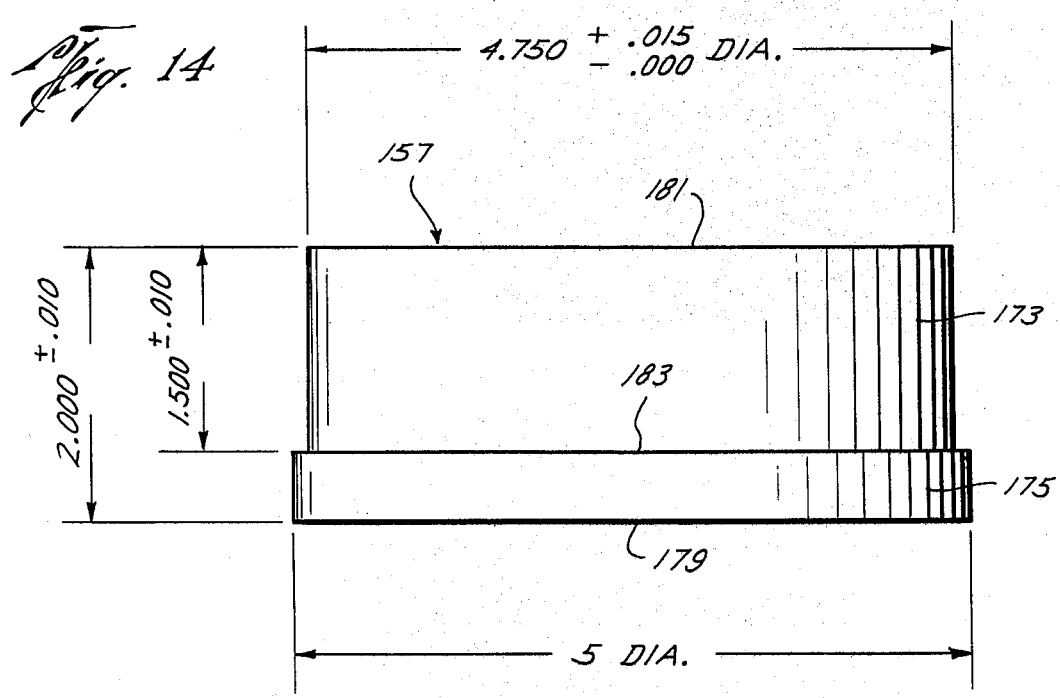
FIG. 14 is a side view of the button shown in FIG. 13.

The end plates 81 of the stabilizer body project radially inwardly beyond inner shell 85 forming therewith an annular pocket 137. Within this pocket is disposed a stack of elastomer rings forming radial bearing 89. The rings 139, one of which is shown in FIGS. 7 and 8, are internally fluted at 141. The flutes extend parallel to the ring axis. The flutes of the several rings making up the stack are aligned so as to form continuous fluid passages extending the length of the stack. These passages connect with the annular fluid passages 142 formed between the inner peripheries of flanges 81 and sleeve 59 when the sleeve is journaled within the stack of rings forming the radial bearing 89.

The rings have rabbets at their inner peripheries as shown at 143. Adjacent rabbets form circumferential grooves 145 on the inside of the stack (FIG. 4) which interconnect the longitudinal fluid passages provided by flutes 141. The rings are cemented together and the resulting stack is cemented to the steel pocket 137. Preferably the elastomer of the rings 139 is a natural or synthetic rubber such as a nitrile that is oil and sea water resistant and has a Shore A scale durometer hardness between 60 and 90, e.g. 70.

THRUST BEARINGS

Referring now to FIGS. 3B, 4 and 9 through 14, each of the thrust bearings 91, 93 comprises a pair of rings or annular inner and outer flanges or thrust plates 151, 153 between which is sandwiched an annular support ring 155 carrying a plurality of thrust bodies or buttons 157.

The inner thrust plates 151 are secured to the end plates of the stabilizer body by screws 159, disposed in countersink holes 161 (FIGS. 11, 12). In like manner, the outer thrust plates 153 are secured to the flanges 67 and 125 by screws 163 disposed in similar countersink holes in the outer thrust plates. The thrust plates are made of steel, preferably a hard, corrosion resistant material, ground flat and smooth on the inner surfaces which engage thrust buttons 157. The plates 151, 153 are interchangeable so that either may be an inner plate or an outer plate. To this end the inner diameters of the thrust plates are larger than the outer diameter of sleeve 59 so that there will be ample fluid passage 165 formed between the sleeve and inner plate for fluid flowing through the thrust bearing. Fluid passages 165 communicate with fluid passages 142 and the longitudinally extending passages formed by flutes 141 inside the radial bearing.

Support rings 155 (FIGS. 9 and 10) are provided with a plurality of annularly disposed circumferentially spaced cylindrical holes 167 positioned radially midway between their inner and outer peripheries 169, 171. Rings 155 are preferably made of hard corrosion resistant steel similar to that of thrust plates 151, 153. Both sides of rings 155 are ground flat and smooth. Rings 155 provide strength and close fitting surfaces to support thrust buttons 157 and retain them in proper position.

Thrust buttons 157 (FIGS. 13 and 14) have generally cylindrical bodies 173 adapted to extend through holes 167 in the retainer ring and fit closely therein. The buttons have enlarged portions at one end, e.g. cylindrical heads 175. The buttons are assembled in ring 155 with alternate buttons having their heads on opposite sides of the ring. When sandwiched between thrust plates 151, 153, the buttons cannot move axially. The ring is held by the button heads midway between and out of contact with the plates. The heads and the protuberant tips 177 (FIG. 4) have smooth flat surfaces 179, 181 adapted to engage the ground surfaces of the thrust plates. The shoulder 183 between the heads and bodies of the buttons are smooth flat surfaces to engage fully with the ground surfaces of the ring 155.

The diameters of heads 175 are small enough so that the heads and tips are spaced apart circumferentially leaving fluid passages 185 therebetween (FIG. 9) which communicate at their inner ends with fluid passages 165 at the inner thrust plates 165 (FIG. 4) and at their outer ends with the fluid passages 187 (FIG. 3B) between the outer shell 87 of the stabilizer body and the flanges 125 and 67 on the stabilizer journal sleeve. Fluid can thus flow through the stabilizer radial and thrust bearings, entering and leaving through the inner peripheries of conical guides 127, 129 at the ends of shell 87.

The thrust bearings can easily be replaced whenever they wear out. The thrust buttons can be pushed out of their support ring and new ones substituted. The support rings can be reground or replaced. The thrust plates can be unscrewed from the adjacent flanges and end plates and reground or replaced. However, the construction is such as to maximize the life of the thrust bearings. The drilling fluid flowing between the buttons cools and lubricates the bearings and washes them clean. The material preferred for the thrust buttons has a long life.

It is contemplated that the subject drilling assembly and stabilizer may be used in connection with the drilling of holes for foundation piers in the bottom of the ocean floor. Here the environment is a highly saline water contaminated with sand, mud, and drilling cuttings. A material for the thrust buttons that has been discovered to be well suited for this environment is a plastic material sold under the tradename "ULTRA-CLADD" or ULTRA-WEAR". This material is an ultra high molecular weight polyethylene. The published physical data sheet for this material lists the following properties:

| | |
|---|---|
| density | .94 grams per cubic centimeter |
| hardness | Rockwell R-64 |
| tensile strength | 6400 psi |
| elongation | 400% |
| deflection temperature at 66 psi | 84 degrees C. |
| melting point | 130–136 degrees C. |
| coefficient of thermal expansion | (7.2) $(10^{-5})$ in./in./deg. F |
| tensile impact | 1030 ft.-lb. per sq. in. |
| impact | stops at 25 feet at 45 calibre Or 357 magnum calibre bullet |
| IZOD impact | did not break between 23 deg. C and $-$ 140 deg. C. |
| environmental stess crack | 4000 F. (50) hours |
| useable temperature range | $-$300 deg. F. to 180 deg. F. |
| water absorption over 24 hours | 0.01 percent |

From "Polymers and Resins" by Brace Golding, copywright 1959, it appears that polyethylene may be made by three general categories of processes, as follows:

| Process | Range of Molecular Weight | Density Range |
|---|---|---|
| (a) high pressure-low density | 5000 to 40000 | .91 to .92 |
| (b) high pressure-high density | — to 50000 | .935 to .94 |
| (c) low pressure-high density | 10000 to 2000000 | .93 to .960 |

The product of the processes (b) and (c) is said to be similar. If the densities are plotted against molecular weight on semilog graph paper, lines through the range terminal points given above for each process have similar slopes and a single line may be used for processes (b) and (c). From this it appears that the molecular weight of "ULTRA-CLADD" or "ULTRA-WEAR" is about 50000. An ultra high molecular weight polyethylene may be said to be one having a molecular weight in excess of 40000, the top of the range for process (a).

"ULTRA-CLADD" or "ULTRA-WEAR" data sheet further discloses it as non-toxic, odorless, tasteless and self-lubricating, to have a low coefficient of thermal expansion, and to be easily machinable, and abrasion resistant. With this and the previously mentioned properties, it constitutes an eminently suitable material for the thrust buttons.

While a preferred embodiment of the invention has been shown and described, many modifications thereof can be made by one skilled in the art without departing from the spirit of the invention.

I claim:
1. A stabilizer comprising
a body including wall contacting means adapted to contact the side wall of an earth bore to centralize a drill stem rotatable in said bore,
said body having an axial opening therethrough providing a radial bearing and adjacent each end having a portion adapted to take thrust, sometimes hereinafter referred to as a thrust portion,
journal means rotatably mounted in the radial bearing and having a radial flange at each end, each flange being fixed against axial movement away from the other flange,
thrust bearing means between each journal flange and the adjacent thrust portion of the body,
each thrust bearing means comprising a floating support ring and anti-friction means carried by the ring and protruding therefrom in the direction that extends between the journal flange and the thrust portion of the body, said ring and said anti-friction means separating said flange and said thrust portion by a distance greater than the thickness of the ring, at least the portion of said anti-friction means that protrudes from said ring transmitting thrust, fluid transmission means to transmit fluid between parts of the earth bore separated by the stabilizer body, said fluid transmission means including outer fluid passage means between said wall contacting means and inner fluid passage means through the stabilizer providing space for fluid passage between the radial bearing and journal and space for fluid passage across each thrust bearing connecting with the ends of the first said space.

2. Stabilizer according to claim 1, said anti-friction means protruding from both sides of each ring to keep the ring out of contact with surfaces rotating relative thereto.

3. Stabilizer according to claim 2, said anti-friction means extending through holes in the rings and including means limiting movement of the anti-friction means through said holes.

4. Stabilizer according to claim 3, said anti-friction means having portions of uniform cross-section adapted for insertion through said holes, said limiting means being heads on said anti-friction means too large to pass through said holes, adjacent anti-friction means being disposed with their heads on opposite sides of the rings.

5. Stabilizer according to claim 4, said anti-friction means being made of plastics material and said thrust portions of the stabilizer body and said journal flanges each being provided with a steel thrust surface engaging said anti-friction means.

6. Stabilizer according to claim 5, said metal being steel and said plastics material being polyethylene.

7. Stabilizer according to claim 6, said polyethylene having an ultra high molecular weight characterized by a density of 0.94 grams per cubic centimeter.

8. Stabilizer according to claim 7, said polyethylene being further characterized as follows:

| hardness | Rockwell R-64 |
|---|---|
| melting point | 130–136 deg. C |
| coefficient of thermal expansion | $(7.2)(10^{-5})$ in./in./deg. F |
| elongation | 400 percent |
| tensile strength | 6400 psi |

9. Stabilizer according to claim 6, said thrust surfaces being provided by thrust rings releasably secured to said thrust portions of the stabilizer body and to said journal flanges, said support rings and anti-friction means being sandwiched between said thrust rings.

10. Stabilizer according to claim 9, said body comprising inner and outer steel shells forming an annular space therebetween and end plates over the ends of said annular space connected to said shells, said end plates being disposed axially inwardly of said thrust bearings.

11. Stabilizer according to claim 10, said radial bearing including a plurality of internally fluted elastomer rings cemented together coaxially to form a stack with the flutes of the rings being aligned so as to form fluid passages extending the length of the stack on the inner periphery thereof, the outer periphery of said stack being cemented to said inner shell, said fluid transmision means including fluid passages through said end plates communicating with said flutes.

12. Stabilizer according to claim 11, said end plates projecting radially inwardly beyond said inner shell forming an annular pocket inside the inner shell between said end plates, said stack of elastomer rings being disposed in said pocket.

13. Stabilizer according to claim 12, said journal means being a sleeve adapted to be spindled over a drill stem and having interlocking means at its upper and lower ends for interlocking with adjacent drill string members to prevent relative rotation therebetween.

14. Stabilizer according to claim 13, said interlocking means at one end of the sleeve comprising one of said radial flanges of said journal means, said flange being connected to said sleeve and having sockets to receive pins on an adjacent drill string members.

15. Stabilizer according to claim 14, the other of said radial flanges being fixed against axial movement away from said one radial flange by clamp means, said sleeve having an annular groove therearound within which said clamp means is disposed, said interlocking means at the other end of the sleeve comprising a clutch jaw adapted to engage a clutch jaw on an adjacent drill string member.

16. Stabilizer according to claim 15, the last said radial flange having stop means thereon engageable with said clamp means to limit relative rotation of the last said flange and said clamp means, said clamp means being in tight frictional engagement with said sleeve to prevent relative rotation therebetween.

17. Stabilizer according to claim 16, each of said radial flanges having an annular thrust plate releasably secured thereto, each plate having a smooth surface engaged with said anti-friction means of said thrust bearing.

18. Stabilizer according to claim 15, including a drill stem extending through said sleeve, said drill stem having a stool carrying pins engaged with said sockets of said one radial flange.

19. Apparatus according to claim 18, including a plurality of said stabilizers spindled on said drill stem and a plurality of annular weight units spindled on said stem alternating with said stabilizers, each weight unit including a sleeve having a clutch jaw at one end engaged with the clutch jaw of the adjacent stabilizer and at the other end a flange with pins engaged with the sockets in the adjacent stabilizer.

20. Assembly according to claim 19, said stem having an annular groove therein adjacent the one of said stabilizer and weight units farthest from said stool, same being a stabilizer, and hold down clamp means around said stem in said groove.

21. Assembly according to claim 20, the outer shell of each stabilizer body including cuffs extending axially past said end plates over said thrust bearings, each cuff having connected to the end thereof an inturned conical guide flange, and conical guard secured about the drill stem adjacent said hold down clamp means and overlying the guide flange of said one stabilizer, said guard being spaced from said guide flange leaving a fluid passage therebetween.

22. Stabilizer according to claim 11, each ring being rabbeted at its inner peripheral edges thereby to form circumferential grooves on the interior of the stack of rings transecting said fluid passages formed by the aligned flutes, the inner peripheries of said end plates being spaced from the outer periphery of the journal sleeve to form annular spaces providing said flow passages through said end plates.

23. A thrust bearing comprising a pair of metal thrust rings, a support ring disposed between said thrust rings, said support ring having a plurality of holes extending all the way therethrough and azimuthally spaced about the axis of the support ring, a plurality of headed buttons of ultra high molecular weight polyethylene disposed one in each of said holes with the heads of adjacent buttons on opposite sides of the ring, each button extending clear through the hole in which it is disposed with the end opposite the headed end extending beyond the ring a distance equal to the axial length of the head of the button.

* * * * *

UNITED STATES PATENT AND TRADEMARK OFFICE
CERTIFICATE OF CORRECTION

PATENT NO. : 4,083,612
DATED : April 11, 1978
INVENTOR(S) : Wallace Fred Olson

It is certified that error appears in the above–identified patent and that said Letters Patent are hereby corrected as shown below:

In the Abstract, line 24, change "side" to -sides-.
Column 4, line 40, change "Gussett" to -gussett-.
Column 5, line 47, after "is" insert -of-.
Column 7, line 58, after "or", insert quotation marks (")
 at the front of the next word.
Column 10, line 22, change "members" to -member-.

Signed and Sealed this

Twenty-fourth Day of April 1979

[SEAL]

Attest:

RUTH C. MASON
Attesting Officer

DONALD W. BANNER
Commissioner of Patents and Trademarks